United States Patent Office 3,286,618
Patented Nov. 22, 1966

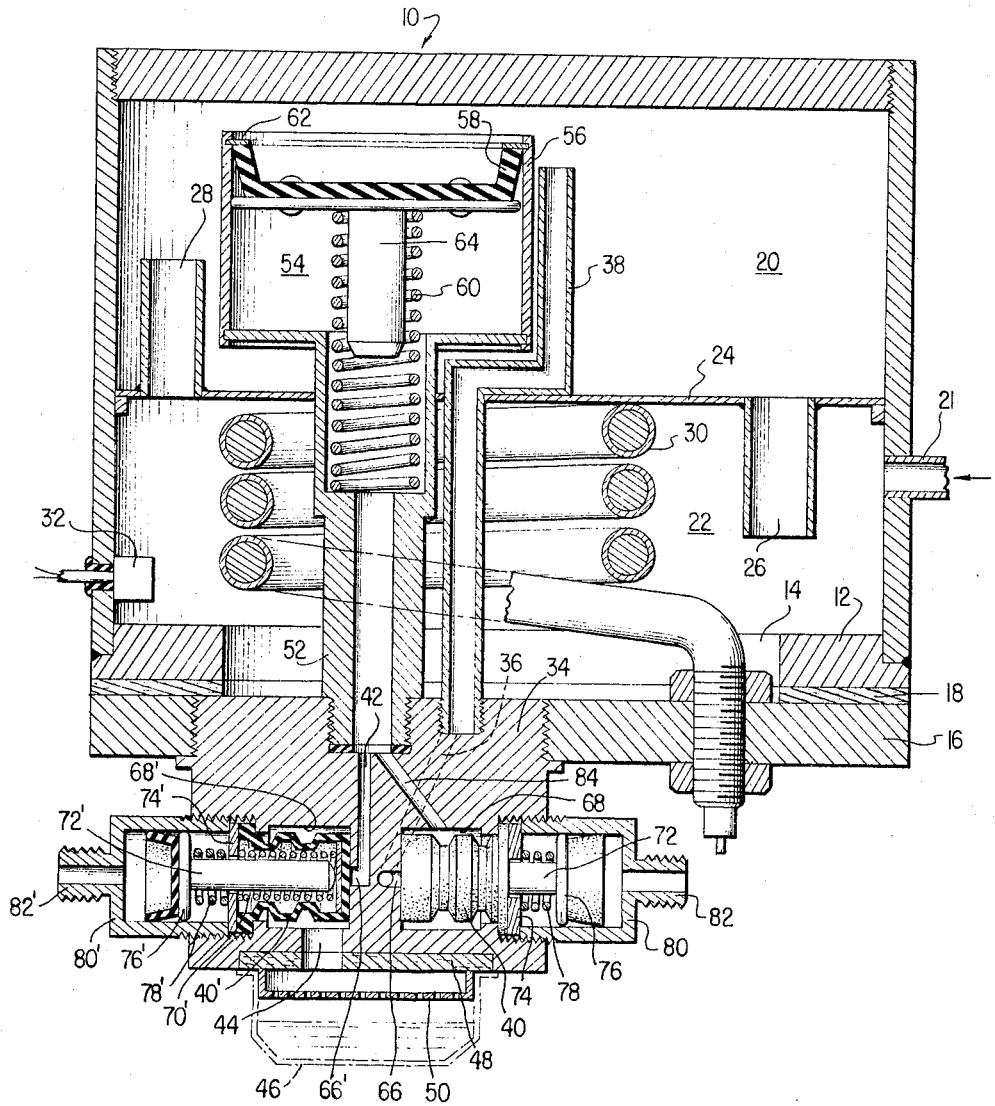

3,286,618
WATER RESERVOIR THERMAL CIRCULATOR AND FLOW CONTROL FOR BREWING MACHINE
Jose Marlet Barrera, Po. Valldoreix 6, San Cugat Del Valles, Barcelona, Spain
Filed Sept. 10, 1965, Ser. No. 486,313
Claims priority, application Spain, Apr. 16, 1962, 276,529
6 Claims. (Cl. 99—302)

This invention is a continuation-in-part of Serial No. 271,777 filed April 9, 1963 and now abandoned.

The invention relates to an improved apparatus embodying a two compartment reservoir for heating water in one compartment and thermally circulating the hottest water portion to the second compartment, means for feeding a measured quantity of the hottest water from the second compartment to a cylinder disposed in the second compartment, and having piston means in said cylinder under control of valves for forcing said measured quantity of water to and through the infuser of a coffee making, or similar brewing, machine.

In conventional coffee making machines, a separate flow control reservoir for the hot water to be fed to the infuser is usually located outside of the boiler. Hence, the ambient atmospheric temperature cools the flow control reservoir and the small quantity of water therein utilized to brew the coffee. As a result, the brew obtained is not as strong, nor as high, or constant, in temperature as should be obtained.

It is a primary object of this invention to avoid the above stated disadvantage by providing an improved water heating and flow control apparatus in which the measured quantity of water, to be forced through the grounds in the infuser, is previously retained wholly within a body of heated water, in the interior of a water reservoir, so that the measured infusing water is not subjected to atmospheric cooling.

Another object of the invention is to provide an improved apparatus, of the above-described characteristics, in which the water to be forced through the infuser is maintained at a virtually constant temperature until infusion takes place.

A further object of the invention is to provide an improved apparatus, of the above described character, in which water is heated in one compartment and thermally circulated to a second compartment, and then fed to a measuring device located wholly within and surrounded by the water in the second compartment.

Yet another object of the invention is to provide an improved apparatus, of the above described character, in which the flow of water to said measuring device is from said second compartment and controlled by a pressure fluid operated, or other type of valve, the flow of measured water from said measuring device to the infuser being similarly controlled by another and similar valve, both valves being automatically operated in appropriate timed sequence to perform a brewing cycle.

A still further object of the invention is to provide an improved apparatus, of the above described characteristics, in which the pressure supplied to force the measured quantity of hot water through the infuser is the pressure of the hot water in said second compartment applied through a piston moving in a cylinder which constitute said measuring device.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein the single figure is a diagrammatic vertical sectional view of an apparatus according to the invention with certain of the parts shown in elevation.

Referring now more particularly to the drawing, the improved apparatus comprises a reservoir 10 formed of walls completely enclosing a volume of space for heating and storing water. The lowermost wall 12 has an opening 14 for passage of various elements including portions of the heater and the water measuring device. This opening is closed by a lower support wall 16 affixed to the reservoir bottom wall 12 and sealed by a gasket 18.

The reservoir is divided into an upper chamber 20 and a lower chamber 22 by a central partition 24. Cold water is fed under pressure into chamber 22 by open duct 21. A conduit 26 extends downwardly from an opening in partition 24 and a second conduit 28 extends upwardly from another opening in said partition.

While the content of lower chamber 22 may be heated by any desired heating source, preferably an electric resistance heater 30 is used having leads extending through sealed openings in the support wall 16 to a source of electric power not shown. The resistance heater is operated in a conventional manner to maintain the water in compartment 22 within a small range of temperatures under the control of thermostat 32, also positioned in lower compartment 22 and having leads extending through a wall of reservoir 10. It will be understood, however, that the thermostat, if desired, may be placed in the upper compartment 20 of the reservoir.

A valve support block 34 is affixed to wall 16 seated in an opening therein in such a manner as to seal the lower reservoir chamber from leakage. Valve block 34 supports a valve 40 shown in elevation and operating mechanism therefor shown partially in section. A passageway 36 in block 34 leads to a pipe 38 which rises through the lower chamber 22 and the baffle 24 to an upper level in the upper reservoir chamber 20. A second valve 40' controls the passageway 42 leading to a measuring and pressure device to be described and when opened permits passage of hot water from said passageway through orifice 44 in block 34 to an infuser cartridge 46. The infuser and its operating mechanism may be conventional and carry a measured quantity of dry beverage grounds. When the brew is to be made, cartridge 46 is moved into sealing engagement with gasket 48 and strainer 50 so that hot water from device 56 will be forced through the grounds during a selected period of time for infusion and brewing, passing through perforations in the infuser 46 to a cup, not shown, for receiving the brewed beverage.

The passage 42 communicates with the bore of a tubular support member 52 which in turn communicates with the interior 54 of a cylinder 56, a piston 58 is movable in said cylinder under pressure of water in the upper compartment 20 to expel all the water which may be stored in the chamber 54 of the cylinder. The piston is urged upwardly by spring 60, seated on a shoulder within the support member 52, to a limiting abutment ring 62 fixed in the upper end of cylinder 56. The piston 58 has a connected guide rod 64 surrounded by the spring 60 which is of such a length as to abut on said shoulder in support 52 to limit the downward movement of the piston to a level which virtually empties water from the chamber 54 of cylinder 56.

Valves 40 and 40' may be and are shown as being of identical construction and are operated by identical means. Therefore, only one valve mechanism will be described in detail, it being understood that the other has the same structure, the similar parts being referred to by the same numbers primed. Valve 40 comprises a corrugated compressible element formed of rubber or similar elastic material and having a closed inner end which closes the valve orifice 66 in the valve chamber 68. The corresponding parts of valve 40' are referenced 66' and 68'. Valves 40, 40' are kept extended to prevent collapse under pressure and clinching, or sticking, to piston rods 72, 72' by the coil springs 70 and 70', bearing at one end against the closed end face of the associated valve and at the other end against the inner end plates 74, 74' of the cylinders 80 and 80'. The piston rods 72, 72' are connected to pistons 76, 76', having rubber sealing cups and ride in said cylinders, pressed outwardly by coil springs 78, 78'. Nipples 82, 82' permit the connection of pressure fluid conduits to the cylinders 80, 80' to move the pistons 76, 76' and rods 72, 72' to extend the valves 40, 40' to close the orifices 66, 66'. Valve block 34 includes another passage 84 which connects the valve chamber 68 to the bore of support 52.

The described device operates in the following manner. Cold water enters lower compartment 22 of the reservoir through the conduit 21 under pressure of the city water mains, or other suitable pressure source. This water is then heated in the lower compartment by the electric heater 30 until it reaches the cutoff temperature of thermostat 32 at which time the electric circuit is opened until the temperature is lowered a preselected number of degrees which causes the thermostat to re-energize the heater circuit. The hottest water in the lower chamber rises to the top by reason of the difference in volume and lower specific gravity and thence moves through pipe 28 into the upper chamber 20. As time passes cooler water in the upper chamber gravitates to its bottom and flows downwardly through tube 26 into the lower chamber 22 to be reheated. Thus, a thermal circulation occurs, the hotter water moving to the upper chamber and the cooler water back to the lower chamber and circulating in this manner so that the upper chamber always houses the hottest portion of the water in the reservoir. Desirably, the reservoir in both compartments contains only water, air having been previously evacuated. However, the device will operate to a degree of satisfaction even if a slight amount of air is trapped in the upper chamber.

Assuming that initially the cylinder measuring device 56 is empty and void of air, the hottest water from the upper level of the upper chamber 20 will descend through pipe 38 and communicating duct 36 to the valve orifice 66 where it is prevented from further movement by application of presure fluid through nipple 82 on piston 76 which closes the valve 40 against orifice 66. However, when fluid pressure through nipple 82 is released, or lowered, by a solenoid valve, or other conventional device, not shown, at an appropriate time in the brewing cycle, the pressure of the water at orifice 66 and in the pipe 38, being the same high pressure as in chambers 20 and 22 introduced by entering water through conduit 21, will force the piston 76 to the right and compressible rubber valve 40 to partially collapse and move outwardly away from the valve orifice 66, allowing the hot water then to travel into the valve chamber 68, through the duct 84 and the bore of support 52, and finally into the cylinder 56 to fill the cylinder chamber 54. Chamber 54, when filled, contains the exact quantity of hot water necessary to brew a desired amount of coffee, or other beverage.

When valve 40 is closed, by again applying pressure fluid through nipple 82 to piston 76, and valve 40' is opened, by releasing the pressure on piston 76', the piston 58 in cylinder 56 will be forced downwardly, against the pressure of spring 60, to empty the hot water contents of cylinder chamber 54 through the bore of the support 52, and duct 42 to move the valve 40' to open the orifice 66'. Once the valve 40' is opened, the water from cylinder 56 passes under pressure of the piston 58 through the valve chamber 68', the duct 44, the baffle or strainer 52 and the grounds in the infuser cartridge 46. Thus, the beverage is brewed in the infuser under pressure which is the same as the pressure in the upper storage compartment 20 and of the entering cold water into lower compartment 22.

Once the coffee is brewed, conventional mechanism, not shown, applies fluid pressure through nipple 82' to the piston 76' to close valve 40' and, simultaneously, if desired, pressure is released on piston 76 causing a fresh supply of the hot water from the upper levels of chamber 20 to descend through pipe 38, open valve 40 and duct 84 to enter and fill the cylinder chamber 54 forcing the piston 58 with the aid of spring 60 back to its initial position as shown. The filled cylinder chamber 54 stores this water until the next cycle when valve 40' is again opened to brew another cup of beverage. It will be apparent from the above that a single brewing cycle involves opening valve 40' to empty chamber 54 under pressure of water in reservoir compartment 20 into and through the infuser cartridge closing valve 40', subsequently opening valve 40 to refill chamber 54, and closing valve 40 to store a measured quantity of hot water in chamber 54 until readied for the next cycle.

The described apparatus is incorporated in a conventional machine in which the brewed beverage requires a minimum period of about fifteen to twenty seconds to obtain an infusion and a succeeding infusion is not started for another eight to ten seconds. All elements of the machine which cooperate with the described apparatus such as the means for moving and filling the infuser cartridge 46, the means for sequencing and operating the valves 40 and 40', etc. are therefore timed to repeat the brewing cycle every twenty to thirty seconds, when more than one cup of brew is desired. Because the brewing of a cup of the beverage is not instantaneous, but involves a cycle of at least twenty to thirty seconds, the open duct 21 feeding cold water into the lower chamber each time the cylinder chamber 54 is emptied does not lower the temperature in the upper chamber 20 of the reservoir below a desired value of at least 101° C. In experiments involving the making of from 1 to 60 cups of coffee, one immediately following the preceding, the following table of temperature values of the water in the lower and upper reservoir chambers were found.

| Number of cups of coffee made | Temperature, ° C. | | | | | |
|---|---|---|---|---|---|---|
| | 30 second cycle | | 25 second cycle | | 20 second cycle | |
| | Lower Chamber | Upper Chamber | Lower Chamber | Upper Chamber | Lower Chamber | Upper Chamber |
| 1 | 108 | 108 | 108 | 108 | 108 | 108 |
| 10 | 104 | 108 | 102 | 108 | 98 | 108 |
| 20 | 104 | 108 | 100 | 106 | 96 | 102 |
| 30 | 103 | 108 | 100 | 106 | 96 | 101 |
| 40 | 103 | 108 | 100 | 106 | 95 | 101 |
| 50 | 103 | 108 | 100 | 106 | 95 | 101 |
| 60 | 103 | 108 | 100 | 106 | 95 | 101 |

It will be readily apparent that the above described device defines a compact unit, fed cold water under pressure to a lower reservoir chamber for heating, a thermal circulation being set up between the lower reservoir chamber and the upper chamber whereby the hottest water is maintained under the pressure of the entering water in the upper chamber, said hottest water completely surrounding a piston cylinder device which under control of the valve 40 receives the hotter water from the upper chamber to fill the measuring device and which under pressure of the water in the upper chamber on opening of the valve 40' empties the measured quantity of hot water into and forces the same through the grounds to be brewed held in an infuser cartridge.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A combined water reservoir, thermal circulator and flow control apparatus for a brew-making machine, comprising a water reservoir, a partition dividing the reservoir into upper and lower chambers, a cold water inlet to said lower chamber, means for heating water in the lower chamber to a predetermined temperature, and two open vertical pipes one extending upwardly and the other downwardly from said partition for communicating said chambers to obtain a thermal circulation of heated water to said upper chamber and cooled water from the upper to the lower chamber, a flow control and metering cylinder disposed within said upper chamber for holding a measured quantity of hot water, a movable piston closing the upper end of said cylinder, an inlet passage connecting the lower end of said cylinder to said upper chamber, an inlet valve movable to open and close said inlet passage, an outlet passage connecting the lower end of said metering cylinder to an infuser port, and an outlet valve movable to open and close said outlet passage.

2. Apparatus according to claim 1, wherein said piston is operable in one direction by the pressure of hot water in said upper chamber to empty water from said metering cylinder, and a return spring urges said piston in the opposite direction to permit refilling of the metering cylinder when said outlet valve is closed and said inlet valve is open.

3. Apparatus according to claim 1 wherein there is additionally provided means for simultaneously closing said inlet valve and opening said outlet valve and for simultaneously opening said inlet valve and closing said outlet valve.

4. Apparatus according to claim 3 wherein said means for simultaneously closing said inlet valve and opening said outlet valve comprises piston cylinder devices adapted to apply and release pressure fluid for operating said valves.

5. A combined water reservoir, thermal circulator and flow control apparatus for a brew-making machine, comprising a completely enclosed water reservoir, a partition dividing the reservoir into upper and lower chambers, means for admitting cold water under pressure to said lower chamber, water heating means in the lower chamber, a pair of pipes one extending upwardly and the other downwardly from said partition for communicating said chambers to obtain a thermal circulation of heated water to said upper chamber and cooled water from the upper to the lower chamber, metering means including an enclosure of predetermined volume and a piston subject to pressure of water in said upper chamber for reducing said volume, inlet and outlet passages connecting said metering means to said upper chamber and an infuser respectively, and valve means operable to close said outlet passage and open said inlet passage to admit water from the upper chamber to the metering enclosure and to close said inlet passage and open the outlet passage whereby pressure of water in the upper chamber moves said piston to discharge a measured quantity of hot water from the metering enclosure to the infuser.

6. A combined water reservoir, thermal circulator and flow control apparatus for a brew-making machine, comprising a completely enclosed water reservoir, a partition dividing the reservoir into upper and lower chambers, means for admitting cold water under pressure to said lower chamber, water heating means in the lower chamber, a pair of pipes one extending upwardly and the other downwardly from said partition for communicating said chambers to obtain a thermal circulation of heated water to said upper chamber and cooled water from the upper to the lower chamber, and valve controlled metering means communicating with said upper chamber and an infuser and operable by pressure of liquid in said upper chamber to discharge a measured quantity of hot water to the infuser.

References Cited by the Examiner

UNITED STATES PATENTS

| 1,218,294 | 3/1917 | Mintz | 99—307 |
| 2,643,322 | 6/1953 | Lime et al. | |
| 2,786,408 | 3/1957 | Herrera | 99—302 X |
| 3,110,243 | 11/1963 | Cimbali | 99—302 |

FOREIGN PATENTS

| 1,161,814 | 8/1958 | France. |
| 566,865 | 9/1957 | Italy. |

WALTER A. SCHEEL, *Primary Examiner.*

S. P. FISHER, *Assistant Examiner.*